(12) United States Patent
Pognant

(10) Patent No.: US 11,700,138 B2
(45) Date of Patent: *Jul. 11, 2023

(54) METHOD FOR CONFIGURING, MONITORING OR SUPERVISING A HOME AUTOMATION INSTALLATION

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 117 days.

This patent is subject to a terminal disclaimer.

(21) Appl. No.: 16/473,571

(22) PCT Filed: Dec. 21, 2017

(86) PCT No.: PCT/FR2017/053773
§ 371 (c)(1),
(2) Date: Oct. 25, 2019

(87) PCT Pub. No.: WO2018/122507
PCT Pub. Date: Jul. 5, 2018

(65) Prior Publication Data
US 2020/0044884 A1    Feb. 6, 2020

(30) Foreign Application Priority Data
Dec. 28, 2016    (FR) ..................... 16/63440

(51) Int. Cl.
*H04L 12/28*    (2006.01)
*H04L 69/18*    (2022.01)

(52) U.S. Cl.
CPC ...... *H04L 12/2807* (2013.01); *H04L 12/2818* (2013.01); *H04L 12/2825* (2013.01); *H04L 12/2836* (2013.01); *H04L 69/18* (2013.01)

(58) Field of Classification Search
CPC . H04L 69/18; H04L 12/2807; H04L 12/2818; H04L 12/2825; H04L 12/2836
(Continued)

(56) References Cited

U.S. PATENT DOCUMENTS 5,944,794 A    8/1999 Okamoto et al.
9,946,857 B2   4/2018 Beals
(Continued)

FOREIGN PATENT DOCUMENTS

CN    104038414 A    9/2014
CN    105245420 A    1/2016
(Continued)

OTHER PUBLICATIONS

Carles Gomez et al: "Wireless home automation networks: A survey of architectures and technologies", IEEE communications magazine, IEEE Service Center; vol. 48, No. 6, (Jun. 1, 2010).
(Continued)

*Primary Examiner* — Wing F Chan
*Assistant Examiner* — Leon Y Tseng
(74) *Attorney, Agent, or Firm* — Cantor Colburn LLP

(57) ABSTRACT

A method for configuring home automation installation including at least one home automation device capable of communicating with at least one central control unit, the method being executed by a management unit capable of communicating with the at least one central control unit; the method including the following steps: receiving, from the central control unit, at least one configuration message relating to at least one home automation device; obtaining a location identifier of the at least one home automation device; recording a correspondence between the location identifier of the at least one home automation device and at least one identification element contained in the configuration message; recording at least one type of the at least one
(Continued)

home automation device; and/or the at least one definition of a function, a state variable and/or a function conversion rule. Also disclosed is a control method and a monitoring method.

11 Claims, 7 Drawing Sheets

(58) Field of Classification Search
USPC .......................................................... 709/222
See application file for complete search history.

(56) References Cited

U.S. PATENT DOCUMENTS

| | | | |
|---|---|---|---|
| 10,075,334 | B1 | 9/2018 | Kozura et al. |
| 10,084,794 | B2 | 9/2018 | Goldfarb et al. |
| 10,530,598 | B2 | 1/2020 | Ansari et al. |
| 10,645,089 | B2 | 5/2020 | Chung et al. |
| 11,394,572 | B2 | 7/2022 | Pognant et al. |
| 2002/0180581 | A1 | 12/2002 | Kamiwada et al. |
| 2003/0051169 | A1 | 3/2003 | Sprigg et al. |
| 2003/0061380 | A1 | 3/2003 | Saito et al. |
| 2007/0288487 | A1 | 12/2007 | Song et al. |
| 2009/0320113 | A1 | 12/2009 | Larsen et al. |
| 2014/0159879 | A1 | 6/2014 | Rezvani et al. |
| 2015/0074259 | A1* | 3/2015 | Ansari .................. H04L 67/02 709/224 |
| 2015/0097689 | A1 | 4/2015 | Logue et al. |
| 2015/0037022 | A1 | 12/2015 | Dubman et al. |
| 2015/0370615 | A1 | 12/2015 | Pi-Sunyer |
| 2016/0112262 | A1 | 4/2016 | Johnson et al. |
| 2016/0134432 | A1 | 5/2016 | Hund et al. |
| 2016/0277413 | A1 | 9/2016 | Ajitomi et al. |
| 2017/0006471 | A1 | 1/2017 | Kim et al. |
| 2017/0063931 | A1 | 3/2017 | Seed et al. |
| 2017/0346905 | A1* | 11/2017 | Pognant .............. H04L 67/141 |
| 2018/0091355 | A1 | 3/2018 | Tamura |
| 2018/0270075 | A1* | 9/2018 | Cosserat ............. H04L 41/12 |
| 2019/0036721 | A1 | 1/2019 | Pognant et al. |
| 2019/0036727 | A1 | 1/2019 | Matson et al. |
| 2019/0052683 | A1 | 2/2019 | Logue et al. |
| 2019/0229985 | A1* | 7/2019 | Coote ................. H04L 41/0803 |
| 2019/0306144 | A1 | 10/2019 | Pognant |
| 2020/0021593 | A1 | 1/2020 | Pognant |
| 2020/0044884 | A1 | 2/2020 | Pognant |
| 2020/0125087 | A1 | 4/2020 | Wu |
| 2020/0233388 | A1 | 7/2020 | Pognant |
| 2021/0056184 | A1 | 2/2021 | Modani et al. |
| 2021/0266326 | A1 | 8/2021 | Chen et al. |
| 2021/0336963 | A1 | 10/2021 | Rovito et al. |

FOREIGN PATENT DOCUMENTS

| | | |
|---|---|---|
| EP | 1260906 A1 | 11/2002 |
| EP | 2416600 A1 | 2/2012 |
| WO | 02093502 A1 | 11/2002 |
| WO | 2009080398 A1 | 7/2009 |
| WO | 2016038374 A1 | 3/2016 |

OTHER PUBLICATIONS

International Search Report for Application No. PCT/FR2017/053773.
John Blackford et al: "TR-069 CPE WAN Management Protocol", pp. 1-228 (Jan. 8, 2014).
English Translation of the Written Opinion for Application No. PCT/FR2017/053773.
International Search Report for Application No. PCT/FR2017/053774.
International Search Report for Application No. PCT/FR2017/053775.
Written Opinion for Application No. PCT/FR2017/053773.
Written Opinion for Application No. PCT/FR2017/053774.
Written Opinion for Application No. PCT/FR2017/053775.
U.S. Non-Final Office Action dated May 13, 2021 for U.S. Appl. No. 16/473,565.
U.S. Non-Final Office Action dated Feb. 3, 2022, U.S. Appl. No. 16/473,568, filed Mar. 31, 2020; (44 pages).
Echonet Consortium: "-i- Echonet Lite Specification II Echonet Lite Communication Middleware Specification", Sep. 3, 2012, pp. 1-52.
English Translation First Office Action for CN Application No. 201780020699.X; Application Date Jan. 23, 2017; 8 Pages.
First Office Action for Application No. CN201780020699.X; 5 pages.
First Search for Application No. 201780020699.X.
International Search Report for Application No. PCT/FR2017/050134; dated Apr. 4, 2017; 6 Pages.
U.S. NonFinal Office Action dated Jun. 23, 2020, U.S. Appl. No. 16/073,274, filed Jul. 26, 2018; 10 pages.
U.S. NonFinal Office Action, dated Jan. 4, 2021, U.S. Appl. No. 16/073,274, filed Jul. 26, 2018; 13 pages.
U.S.Final Office Action dated Nov. 30, 21, U.S. Appl. No. 16/473,565, filed Sep. 25, 2019; (26 pages).
Written Opinion for Application No. PCT/FR2017/050134; dated Apr. 4, 2017; 16 Pages.
U.S. Notice of Allowance dated Aug. 31, 2022, U.S. Appl. No. 16/473,565, filed Sep. 25, 2019; (11 pages).
Notice of Allowance for U.S. Appl. No. 16/473,568; dated Oct. 26, 2022; (15 pages).
U.S. Final Office Action dated Jul. 15, 2022, U.S. Appl. No. 16/473,568, filed Mar. 31, 2020; (21 pages).
U.S. Non-Final Office Action dated May 13, 2021, U.S. Appl. No. 16/473,565, filed Sep. 25, 2019; (27 pages).

* cited by examiner

| P1F | P2F |
| --- | --- |
| P1T | P2T |
| P1S | P2S |

| DURL | P1S/P1F/P1T | P2A | P2S/P2F/P2T |
| --- | --- | --- | --- |
| DURLD1 | P1S1D1 / P1S1F1 | P2AD1 | P2S1D1 / P2S1F1 |
| DURLD1 | P1S2D1 / P1S2F2 | P2AD1 | P2S2D1 / P2S2F2 |
| DURLD2 | P1S1D2 / P1S1F2 | P2AD2 | P2S1D2 / P2S1F2 |
| DURLD2 | P1S2D2 / P1S2F2 | P2AD2 | P2S2D2 / P2S2F2 |
| DURLD1 | P1TD1 | P2AD1 | P2TD1 |

METHOD FOR CONFIGURING, MONITORING OR SUPERVISING A HOME AUTOMATION INSTALLATION

CROSS REFERENCE TO RELATED APPLICATIONS

This application is a National Stage of PCT Application No. PCT/FR2017/053773 filed on Dec. 21, 2017, which claims priority to French Patent Application No. 16/63440 filed on Dec. 28, 2016, the contents each of which are incorporated herein by reference thereto.

FIELD OF THE INVENTION

The present invention concerns a configuration method, a discovery method and a monitoring or supervision method of a home automation installation.

PRIOR ART

A home automation installation of a building may comprise a plurality of home automation devices. It is known to proceed with the configuration, and with the monitoring, that is to say with the control and/or the supervision of said installation using a central control unit which communicates with one or several home automation device(s).

In such an installation, the home automation devices are disposed on a local area network and may communicate according to a plurality of local protocols, in particular home automation protocol type local protocols, for example a proprietary protocol which does not uses an IP addressing, or else communication protocols on top of the IP protocol, or a generic point-to-point protocol, for example Bluetooth.

The presence of different communication protocols does not enable an easy communication with the devices or requires providing for the implementation of several communication protocols in order to enable the communication with these devices, which increases the cost and/or the complexity of the programming to access these devices.

Moreover, the home automation devices are disposed on a local area network and are not easily accessible for a communication, a control or a supervision by a remote device or node, in particular via a wide area network.

The present invention aims to solve all or part of the aforementioned drawbacks.

DISCLOSURE OF THE INVENTION

To this end, the present invention concerns a configuration method of a home automation installation comprising at least one home automation device and at least one central control unit, the at least one home automation device being prone to communicate with the central control unit; the method being executed by a management unit prone to communicate with the at least one central control unit via at least one first protocol; the method comprising the following steps:
  Reception, from the central control unit, of at least one configuration message relating to at last one home automation device and to:
  a type of the at least one home automation device; and/or
  at least one definition of a function or of a group of functions of the at least one home automation device according to said first communication protocol; and/or
  at least one definition of a state variable or of a group of state variables of the at least one home automation device according to said first communication protocol;
  Obtainment of a location identifier of the at least one home automation device according to a target second communication protocol;
  Registration of the correspondence between the location identifier of the at least one home automation device according to the second communication protocol and of at least one identification element contained in the configuration message or determinable upon reception of the configuration message whose content or combination enables a unique identification of a home automation device;
  Registration of the at least one type of the at least one home automation device; and/or of the at least one definition of a function or of a group of functions of the at least one home automation device and/or of the at least one definition of a state variable or of a group of state variables of the at least one home automation device; and/or of a function conversion rule arranged to convert the definition of the at least one function or group of functions according to the first communication protocol into at least one definition of a function or of a group of functions according to the target second communication protocol and/or of a state conversion rule arranged to convert the definition of the at least one state variable according to the first communication protocol into at least one definition of a state variable according to the target second communication protocol.

Thanks to the arrangements according to the invention, it is possible to set up a publication of a location identifier, according to the target second communication protocol for home automation devices that can communicate only according to a local or proprietary protocol, without having to make changes neither on this at least one device nor on the central control unit to which the device is related, and thus link this at least one device with other nodes of a wide area network defined according to the second communication protocol.

Once the steps of the configuration method are completed, the home automation device is virtualized. The management unit can act on behalf of the home automation device on the network according to the second communication protocol.

Thus, it is possible to present functions/commands or state variables of the at least one device for a monitoring according to the second protocol. The functions/commands may be translated between the first communication protocol and the second communication protocol by the conversion rules. The definition of the at least one function or of the at least one state variable may be explicit or determined from at least one definition of a type according to said first communication protocol of the at least one home automation device which may be determined from the configuration message or from a known group of functions depending on the considered protocol («function cluster»).

According to one possibility, each home automation device is identified by a location identifier, as if it was able to ensure a communication on its own. Hence, several distinct devices have distinct location identifiers according to the second protocol. The management unit receives the messages addressed to these identifiers and is capable of ensuring the processing and/or the routing thereof up to the central control unit to which the device is related, by using the conversion rules so as to communicate a converted message according to the first protocol.

According to another possibility, a group of devices is identified by the same identifier according to the second protocol. These arrangements allow considering a configuration of a group of devices controllable as one single device, effectively by one single function call.

According to one variant, the method comprises a plurality of correspondences between a device communicating according to the first communication protocol and location identifiers according to several second control methods. These arrangements allow virtualizing the device in order to make it communicate according to several target second protocols.

According to one variant, the management unit sends a subscription message to a home automation device or to a central control unit to which a device is related in order to subscribe to notifications relating to at least one state variable of at least one home automation device. Thus, notifications regarding the state variables will be communicated to the management unit in the context of a supervision method.

According to one implementation, the method comprises a determination of an indexing key based on identification elements contained in the configuration message or determinable upon reception of the message whose combination enables a unique identification of a home automation device.

The identification is unique over all home automation devices likely to be accessed by the management unit.

According to one implementation, the different identification elements, considered individually, are not necessarily unique for each device; but the combination of two or several information elements must be so. The identifier of the central control unit to which the home automation device is related or the address of the home automation device, or possibly that of its parent in a hierarchical addressing system in the local area network managed by the central control unit are examples of identification elements.

According to one implementation, a device unique identifier may be defined, this identifier may use in particular an address notation independent from the protocol, for example according to a URL-type format.

According to one implementation, the device unique identifier comprises a device logical address.

According to one implementation, the device logical address comprises:
  a communication protocol type of the device;
  a communication path to the device.

According to one implementation, the communication path to the device includes the possible intermediate central control units and the termination addresses or location identifier to cross, preferably organized according to a hierarchical topology.

According to one implementation, the device logical address further comprises a subsystem identifier if subsystems or subsets of the device may be defined.

In the context of the present invention, a third protocol is a communication protocol used for the communication between the management unit and at least one central control unit, a third protocol is for example a communication protocol on top of the IP protocol and/or a generic protocol enabling a point-to-point communication. As example, the transport protocols on IP such as Websockets, MQTT or CoAP may constitute a first communication protocol.

In the context of the present invention, a target second protocol is for example a communication protocol on top of the IP protocol on a wide area network or a generic protocol enabling a point-to-point communication. As example, a protocol using IPv6 may be used.

According to one implementation, the target second protocol is a protocol on top of the IP protocol.

In the context of the present invention, a local first protocol is a local communication protocol, in particular a non-IP local protocol, for example a home automation protocol, in particular a proprietary-type home automation protocol. There may be several local protocols. As example, the Z-Wave, EnOcean or io-Homecontrol protocols may constitute a local first protocol. Alternatively, a first protocol may also be a communication protocol on top of the IP protocol or a generic protocol enabling a point-to-point communication. As example, the WEAVE application protocol using 6lowpan and thread transport protocols for a mesh network may constitute a first protocol.

In particular, the first protocol is used for the communication between a central control unit and at least one home automation device related to said central control unit.

In the context of the present invention, a transport network is a network for linking the at least one device and the central control unit by the third protocol. This network enables transport and addressing.

In the context of the present invention, a node is an equipment present on a network using the second communication protocol which possesses a unique location identifier on the considered wide area network.

In the context of the present invention, a location identifier is a unique identifier in the considered network.

In the case of the first communication protocol, it is particularly possible to use an address in a proprietary format corresponding to the used home automation protocol. In the case of the target second protocol, a location identifier may be in particular a network address, such as for example an IPv4 or IPv6 address, or still a composition of a network address and of a resource identifier indicated by an access path, for example in the form of the following URL:
  <protocol>://<host address>[:<port>]/<resource path>

In the context of the present invention, a home automation device is a home automation equipment and/or a sensor, or still a portion of a home automation equipment or a portion of a sensor corresponding to a functional subset. A home automation device may also correspond to a control point of other home automation devices.

In the context of the present invention, a message is an information element notified or received via a communication module from an external equipment, or in the form of a synchronous or asynchronous call, which may also correspond to a local or remote function call.

In the context of the present invention, a home automation installation or installation is a set comprising a plurality of home automation devices and at least one central control unit disposed on one single building or on a plurality of locations, each home automation device being related to a central control unit among the plurality of central control units, the plurality of central control units forming a group under the control of one user. The electronic devices form groups of at least one home automation device related to a central control unit.

In the context of the present invention, a central control unit of the home automation installation is an electronic unit comprising:
  at least one processing unit for containing and executing at least one computer program,
  at least one communication module intended to monitor and/or control at least one home automation device; alternatively the electronic unit may be integrated to a home automation device; and at least one module for communication with the management unit.

In some applications, a central control unit may communicate with the management unit through an intermediate management unit, for example a third-party service provider, whose intermediate management unit provides a service interface or API.

The central control unit may also be integrated to a router and/or a modem achieving a connection to a wide area network, in particular the Internet.

According to one implementation, a management unit is a server remotely connected to the at least one home automation installation, via a wide area network. It should be noted that the term server is a logical designation which may cover the use of several physical servers to distribute the computer processing load to be carried out.

According to another aspect of the invention, the management unit is a central unit intended to be connected to one or several central control unit(s) on distinct private or local area networks, or else on the same local area network.

In the context of the present invention, a state variable is an element describing the state of a home automation device. The value of a state variable may correspond to the ON/OFF condition for a switch, or to an opening degree or percentage for a shutter. Moreover, a state variable may correspond to a measurement value of a sensor, for example a value of a physical or environmental quantity. The description of the states of the devices may be generic or specific, depending on the local protocol. The identifiers of the state variables may be numeric or alphanumeric. The values of the state variables may use formats or scales which are customized or proprietary.

In the context of the present invention, a command/function corresponds to an order that may be given to a home automation device in order to carry out an action by this device or to obtain an information feedback, for example an information relating to a state variable of this device.

According to one possibility, the method comprises a plurality of steps of receiving configuration messages corresponding to a plurality of first communication protocols.

According to one possibility, the method comprises a plurality of steps of emitting discovery messages according to a plurality of first communication protocols.

According to an implementation, the step of obtaining the location identifier corresponds to a reception of an input by the user of a location identifier according to the second communication protocol.

According to an implementation, the step of receiving a configuration message comprises a declaration by the user of the location identifier according to the first communication protocol and/or a declaration by the user of at least one function or of a device type according to the first communication protocol.

According to one implementation, the conversion step comprises the restriction of the requested function or the banning of a command/function to be carried out.

These arrangements allow performing, in particular during the conversion, a limitation of the ranges of command values or preventing the completion of some commands. These arrangements are implemented at the level of the management unit, without requiring any modification at the level of the equipment.

According to one implementation, the configuration method may be triggered by the reception of a message received by the management unit or the central control unit originating from a user terminal.

According to one variant, a press on a button of the central control unit may also enable the triggering of the method. Alternatively or complementarily, an action on a home automation device, such as a press on a button may be considered for triggering of the method.

According to one implementation, the method further comprises the following step:
Obtainment of at least one function conversion rule arranged to convert the definition of the at least one function according to the first communication protocol into at least one definition of a function according to the target second communication protocol and/or of a state conversion rule arranged to convert the definition of the at least one state variable according to the first communication protocol into at least one definition of a state variable according to the target second communication protocol,
Registration of the at least one function conversion rule and/or of the at least one state conversion rule.

According to one implementation, the obtainment step comprises a step of downloading conversion rules originating from a third-party server.

According to one implementation, the download step may intervene when the concerned at least one conversion rule is not locally available on the management unit.

According to one implementation, the method further comprises the following step:
definition of an action to carry out at least partially by the central control unit or the management unit in correspondence with a function according to the second protocol corresponding to a location identifier.

These arrangements allow proceeding with a function addition or with a function simulation, when the home automation device corresponding to the considered identifier cannot provide the requested command.

According to one implementation, the conversion step comprises the restriction of the requested function or the banning of a command/function to be carried out.

The present invention also concerns a discovery method of a home automation installation comprising at least one home automation device and at least one central control unit, the at least one home automation device being prone to communicate with the central control unit; the method being executed by a management unit prone to communicate with the at least one central control unit via at least one first protocol; the method comprising the following steps:
Sending at least one compliance announcement or description message according to a target second communication protocol in connection with:
at least one location identifier of the at least one home automation device according to the second communication protocol corresponding to a location identifier of the at least one home automation device according to the first communication protocol; and
optionally, a type of the at least one home automation device or at least one description of a function or of a group of functions according to the second communication protocol and/or at least one description of a state variable or of a group of state variables of the at least one home automation device according to the second communication protocol.

According to one implementation, sending of the message corresponds to a response to a query or to a message originating from a node comprising a filter criterion for example on the basis of a location identifier or a group of location identifiers or else on the basis of information relating to an installation and/or to an account of a user and/or to a type of products.

According to one implementation, sending of the message corresponds to a response to a query or to a message originating from a node addressed to a location identifier on the management unit corresponding to a location identifier of a register.

The compliance announcement message may also be considered as an existence declaration message.

According to one possibility, the at least one compliance announcement message and the at least one description message may be combined.

According to one possibility, sending of the description message follows the reception of a discovery message.

According to one implementation, the discovery method comprises a step of receiving at least one discovery message originating from a node communicating according to a second communication protocol.

According to one variant, the management unit may periodically check-up the availability of the home automation devices via a central control unit and send description and/or existence declaration messages only in case of availability of the concerned home automation device.

According to one implementation, the discovery method comprises the steps of a configuration method as previously described.

The present invention also concerns a control method of a home automation installation comprising at least one home automation device and at least one central control unit, the at least one home automation device being prone to communicate with the central control unit; the method being executed by a management unit prone to communicate with the at least one central control unit via at least one first protocol; the method comprising the following steps:
  Reception of at least one control message originating from a node communicating according to a second communication protocol comprising at least one location identifier of a home automation device according to the target second communication protocol and at least one definition of a function of the home automation device according to the second communication protocol;
  Determination of at least one identification element of the home automation device whose content or combination enables a unique identification of the home automation device based on the location identifier of the at least one home automation device according to the second communication protocol;
  Optionally, application of a function conversion rule arranged to convert the definition of the at least one function according to the target second communication protocol into at least one definition of a function according to the first communication protocol;
  Sending at least one control message to the at least one central control unit to which the at least one home automation device corresponding to the at least one identification element is related, the control message relating to the function according to the first communication protocol.

According to one implementation, the step of applying a conversion rule may comprise the completion of processing steps complementary to the command call, in particular if a portion of the function cannot be carried out on the home automation device, and in particular a partial enrichment of the function As example, a planning of a command may be provided if the device itself does not enable such a planning. Thus, it is possible to implement on the management unit a «Calendar Weave» type function in order to trigger an opening command on Monday at 8.00 AM for an awning-type home automation device.

Also as example, a parameter conversion may be carried out by the management unit.

According to one implementation, prior to the step of receiving a control message, a connection may be established between a node communicating according to the second communication protocol and the management unit.

Thus, the management unit acts on the communication network according to the second communication protocol as a virtual representative of the home automation devices.

According to one implementation, the control method comprises the steps of a configuration method as previously described.

According to one implementation, the control method comprises the steps of a discovery method as previously described.

According to one implementation, the control method further comprises the following steps:
  Reception of at least one control feedback message originating from the at least one central control unit to which the at least one home automation device is related according to the first communication protocol;
  Optionally, application of a function conversion rule in order to convert a control feedback information expressed according to the first communication protocol into a control feedback information expressed according to the target second communication protocol;
  Sending at least one control feedback message to the at least one node communicating according to a second communication protocol, the control feedback message comprising a control feedback information according to the target second communication protocol.

The present invention also concerns a supervision method of a home automation installation comprising at least one home automation device and at least one central control unit, the at least one home automation device being prone to communicate with the central control unit; the method being executed by a management unit prone to communicate with the at least one central control unit via at least one first protocol; the method comprising the following steps:
  Reception of a supervision message originating from a central control unit to which a home automation device is related comprising an information relating to a value of at least one state variable of the at least one home automation device according to said first communication protocol;
  Application of a state conversion rule in order to convert the at least one information relating to a value of at least one state variable of the at least one home automation device expressed according to the first communication protocol (P1) into a value of at least one state variable of the at least one home automation device expressed according to the target second communication protocol;
  Determination of a location identifier of the at least one home automation device according to the second communication protocol based on at least one identification element contained in the supervision message or determinable upon reception of the supervision message whose content or combination enables a unique identification of a home automation device;

Sending at least one supervision message to at least one node communicating according to a second communication protocol, the supervision message comprising an information relating to a value of at least one state variable of the at least one home automation device according to the target second communication protocol and in connection with the location identifier of the at least one home automation device according to the second communication protocol.

According to one implementation, the steps of applying a conversion rule and of address adaptation may be carried out sequentially in any order or simultaneously.

According to one possibility, sending of the supervision message may be carried out on the initiative of the central control unit spontaneously or upon reception of a supervision message originating from a home automation device.

According to another possibility, the supervision message may be sent upon reception by the management unit of a request message originating from a node communicating according to the second communication protocol. According to this second possibility, the management unit comprises a space or base for storing the values of state variables for the home automation devices that are related to the central control units that it takes into account.

According to one variant, the management unit periodically consults the values of state variables of the home automation devices, detects the modifications on the values of state variables by comparing a last obtained value and at least one value already stored. In case of a modification, the management unit sends a supervision message relating to the modified variable state value to at least one node communicating according to the second communication protocol.

These arrangements allow implementing an event-based emulation for a device that does not offer such a feature.

According to one implementation, the control method comprises the steps of a configuration method as previously described.

According to one implementation, the control method comprises the steps of a discovery method as previously described.

According to one implementation, the sending step is carried out to at least one node registered in a subscription list to an event relating to the at least one state variable.

According to one variant, the sending step may be indifferently carried out to a set of nodes present on the network communicating according to the second communication protocol. This arrangement corresponds to a mode called «Broadcast» mode.

According to one implementation, the control method comprises a step of sending to a central control unit to which a home automation device is related a request for registration in a subscription list to an event relating to the at least one state variable of the home automation device.

The different non-incompatible aspects defined hereinabove may be combined.

BRIEF DESCRIPTION OF THE FIGURES

The invention will be better understood from the detailed description which is exposed hereinafter with reference to the appended drawing in which.

DESCRIPTION WITH REFERENCE TO THE FIGURES

In the following detailed description of the figures defined hereinabove, the same elements or the elements filling identical functions may preserve the same references so as to simplify the understanding of the invention.

Description of a system comprising a home automation installation

Figure 1:
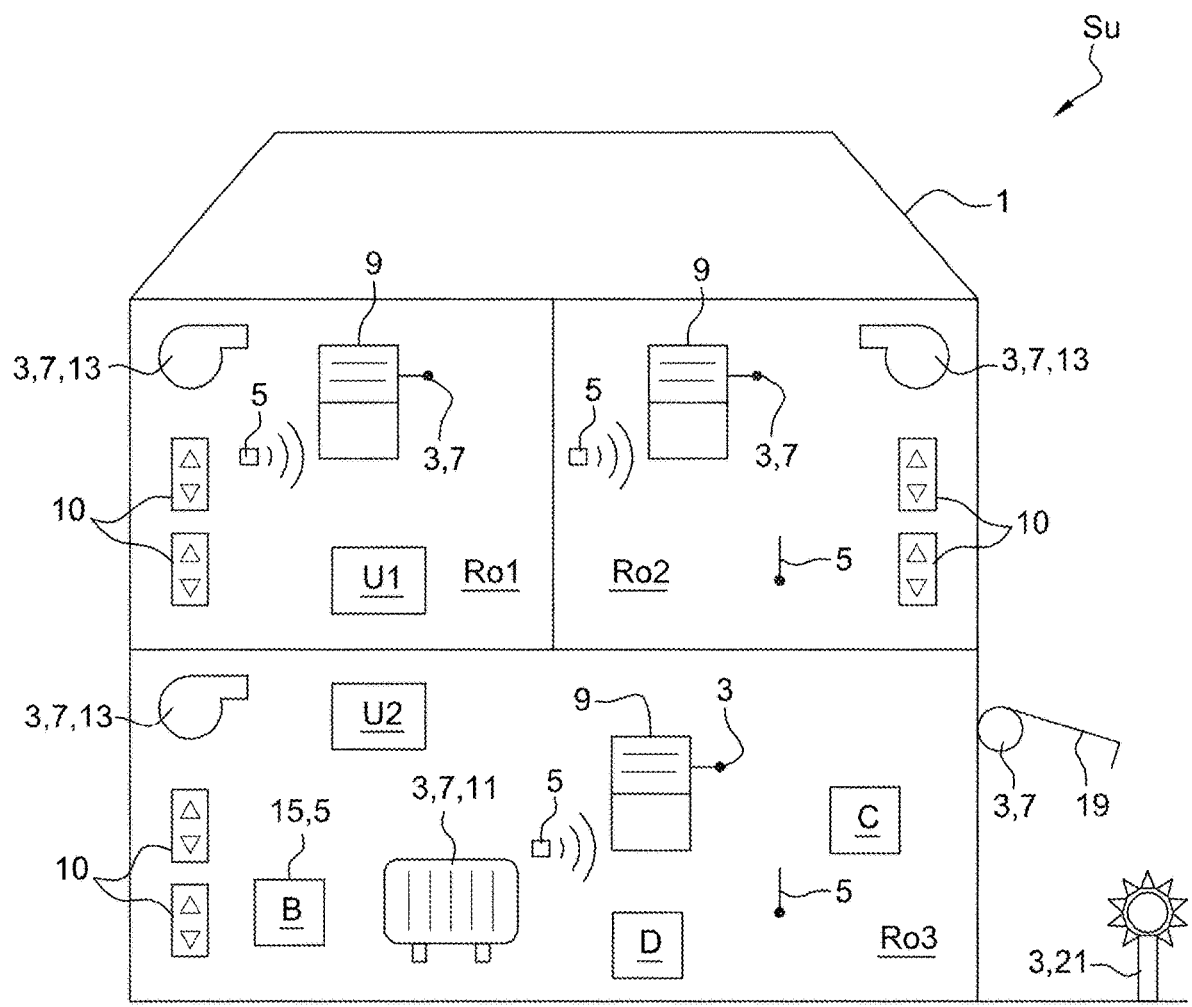
FIG. 1 is a schematic view of a building and of a home automation installation.

As illustrated in FIG. 1, a building 1 comprises for example three rooms Ro1, Ro2, Ro3. The building 4 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, an alarm system, or still a video camera, in particular a video-surveillance camera.

The home automation installation Su may also comprise a control point 15 an actuator 7, such as a wireless control box B for the rolling shutter 9.

The home automation installation Su may comprise one or several sensor(s) 5, integrated to an actuator 7, to a control point 15 or to the control box B or independently of these elements. In particular, a sensor 5 may be arranged to measure a physical unit, for example a temperature sensor, an insolation sensor or a humidity sensor. Position sensors 5 of home automation equipment 3 of the building 1, such as, for example, sensors of the open state of a rolling shutter 9 or sensors of the position of a door leaf such as a window, whether motorized or not, may also be provided. The home automation installation may also comprise one or several presence sensor(s).

A home automation equipment 3 and a sensor 5 should thus be considered as units having information on observed actual states of elements of the building 1 and being capable of sharing this information with other elements of the home automation installation Su.

The home automation equipment 3 and the sensors 5 can thus have access to any measurable physical unit, such as the temperature of each room Ro1, Ro2, Ro3 or a state of an element of the building 1, such as the open state of a rolling shutter 9, the state of an alarm, etc.

In the following, we will use the home automation device or device D designation indifferently to designate sensors or home automation equipment, or parts of home automation equipment 3 or sensors 5.

The home automation installation Su comprises a plurality of central control units U1, U2. In particular and as example, two central control units U1, U2 are represented in FIG. 1. According to one variant, a home automation installation may also comprise one single central control unit.

Each central control unit U1, U2 is arranged to control and/or monitor part of the devices D of the installation Su forming a group DGrU1, DGrU2. As example, in FIG. 1, the central control unit U1 is in charge of the devices D disposed in the rooms Ro1 and Ro2 of the first floor of the building, whereas the central control unit U2 is in charge of the devices D disposed in the room Ro3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

Figure 2:
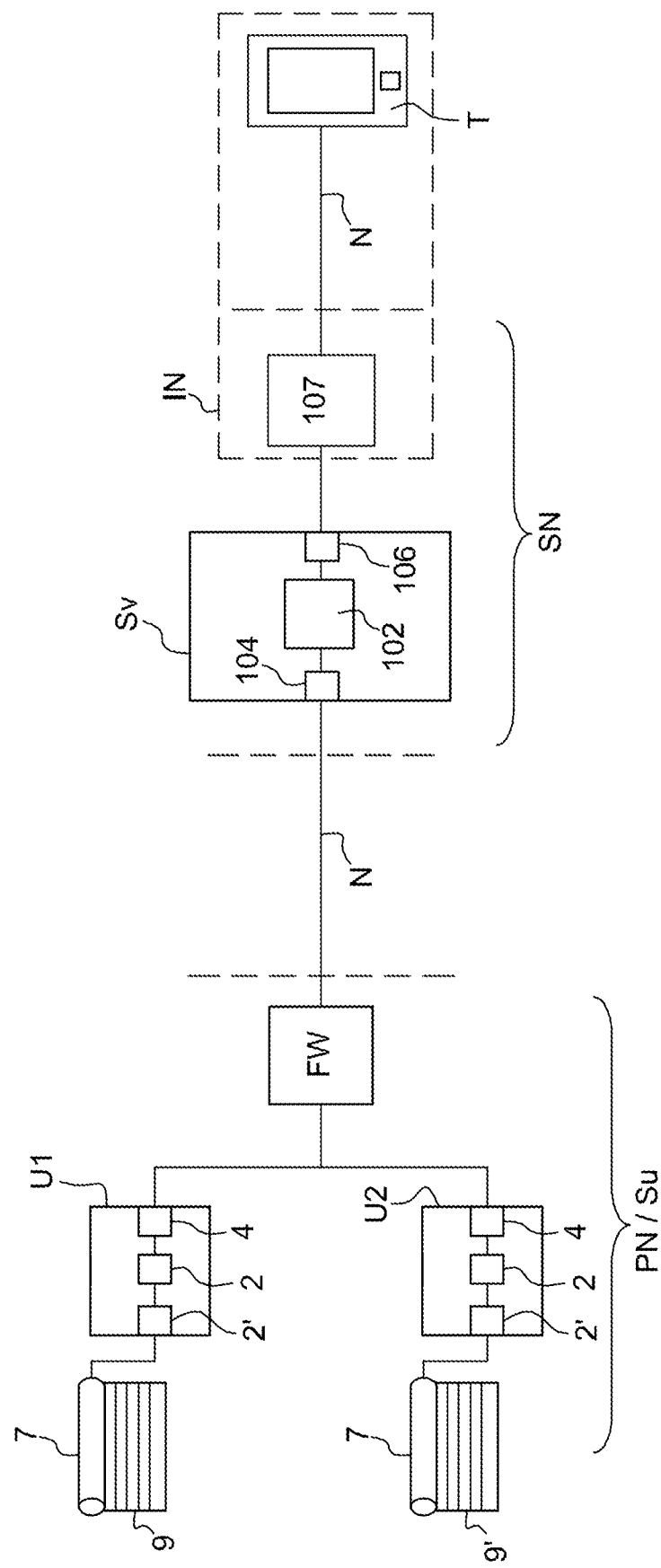
FIG. 2 is a diagram presenting an architecture of a system comprising the home automation installation illustrated in FIG. 1, a second home automation installation, as well as a server intended to be connected to a user terminal.

As represented in FIG. 2, each central control unit U is arranged to communicate with a server Sv.

The central control units U1, U2 are disposed on a private network PN, whose access is generally protected by a firewall FW. The server Sv is also disposed on a private network SN. The private network PN is linked to a wide area network N, for example the Internet. Of course, the server Sv is arranged to communicate with a set of such central control units U. We will describe in the following one of these units.

A central control unit U comprises a processing unit 2 arranged to contain and execute a first computer program. As example, the processing unit 2 comprises a processor, a storage flash memory as well as a random access memory, and an Ethernet chip.

The central control unit U further comprises at least one communication module 2' intended to monitor and/or control home automation equipment 3 and/or sensors 5, the home automation equipment 3 may consist of actuators 7, lightings 21, an alarm system, or a video camera.

As example, as represented in FIG. 2, the communication module 2' enables the monitoring and control of at least one actuator 7, a movable element of the building 1, such as for example a rolling shutter 9, or an orientable sunshade 9' or other actuators 7 or lightings 21, as previously described with reference to FIG. 1, according to the local first communication protocol P1.

As example, the communication module 2' may be arranged to implement for example one or more of the local first protocols P1 such as for example Z-Wave, EnOcean, io-Homecontrol, Somfy RTS, KNX, MODBUS, Wavenis, Philips HUE. In general, these local protocols are non-IP local communication protocols.

According to another possibility, for example in the context of alarm systems, the central control unit may be integrated into the home automation device.

According to still another possibility, the central control unit may also be integrated to a router and/or a modem achieving a connection to a wide area network, in particular the Internet.

There is also provided the reception of information from a sensor 5 providing information on the presence of a user or values of the surrounding parameters such as temperature, humidity and luminosity. In the same manner, the central unit U may enable the monitoring and/or control of an alarm system.

Each central control unit U further comprises a module 4 for communicating with the server Sv according to a third communication protocol P3. The server Sv enables the remote control and/or monitoring and comprises one or several processing unit(s) 102 arranged to contain and execute a second computer program.

In some applications, a central control unit U may communicate with the server Sv through an intermediate server Sv', for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface IN enabling a user to remotely monitor the home automation installation.

It should be noted that the term server is a logical designation which may cover the use of several physical servers to distribute the computer processing load to be carried out.

For example, the control and/or monitoring interface IN comprises a web server 107 and a mobile communication terminal T communicating via the wide area network N. For example, the mobile communication terminal T may consist of a smartphone or a tablet. The mobile communication terminal T may be the same or a terminal of the same type as that with which the central control unit U communicates locally by means of the communication module 4' we will detail later on, or a different terminal. We will designate these mobile terminals indifferently by the reference T.

The control and/or monitoring interface IN comprises a processor which may be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

FIGS. 1 and 2 describe an installation Su which comprises a set of devices D and a plurality of central control units U1, U2, disposed within the same dwelling, the same building or the same physical location.

Networks Corresponding to the First, Second and Third Protocols

Figure 3:
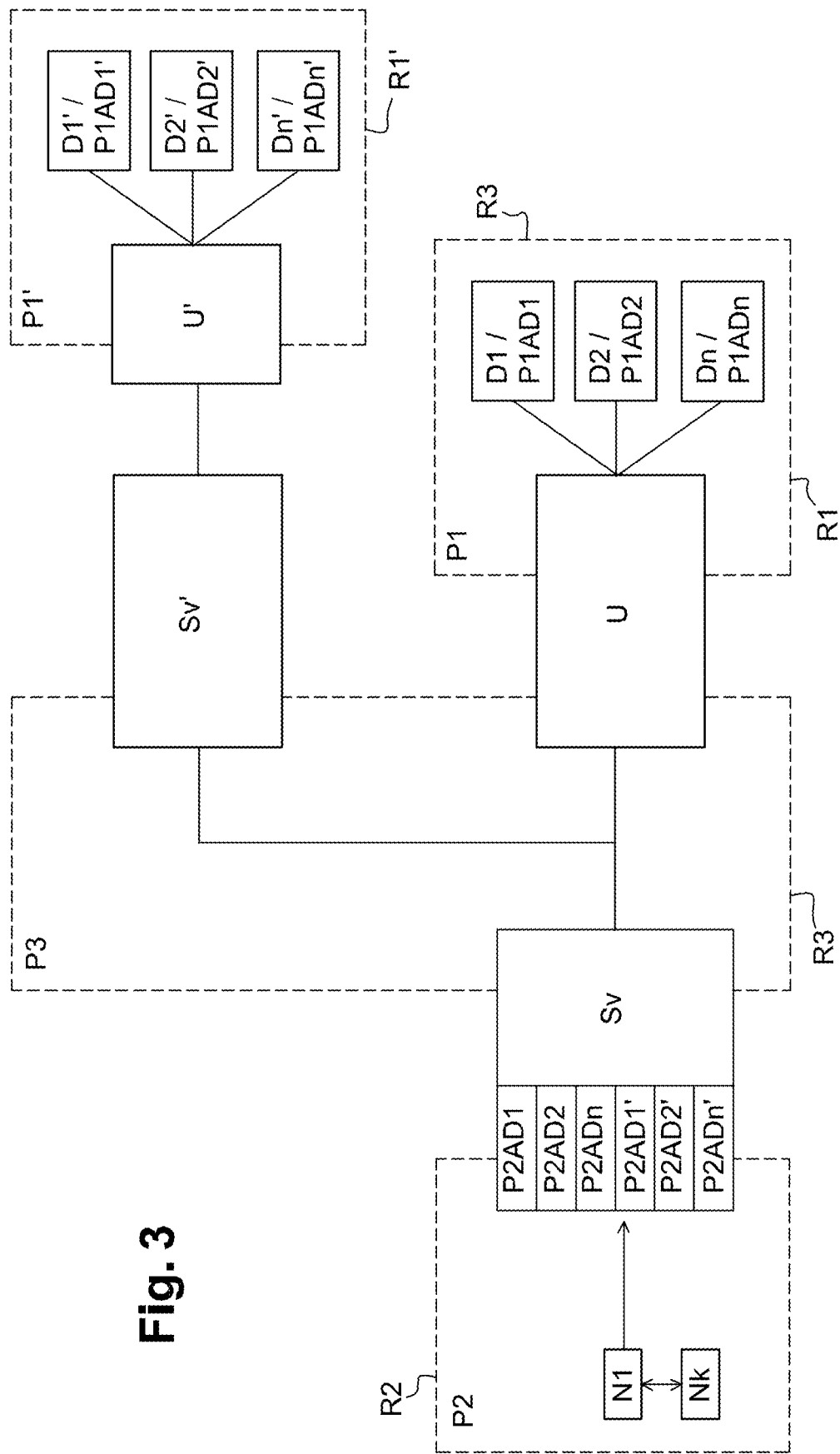
FIG. 3 is a diagram representing the relationships between a management unit, an additional management unit, a central control unit communicating with the management unit according to a third protocol, network nodes communicating according to a target second protocol and devices of the home automation installation communicating according to a local first communication protocol.

As shown in FIG. 3, the devices D1, D2, Dn belong to a local area network R1 managed by a central control unit U within the home automation installation and communicate according to a local first communication protocol P1 with the central control unit U. The devices D1, D2, Dn have a location identifier constituted by a local address P1AD1, P1AD2, P1ADn in this network. The logical devices D1, D2, Dn may be modelled as nodes or end points in the local area network.

A second group of home automation devices D1', D2', Dn' is represented which belongs to a local area network R1' managed by a central control unit U' within a second home automation installation and communicate according to a local first communication protocol P1' with the central control unit U'. The devices D1', D2', Dn' possess a location identifier constituted by a local address P1AD1', P1AD2', P1ADn' in this network. The central unit U' communicates with the server Sv through an intermediate server Sv'.

The central control unit communicates with the Server Sv by a third communication protocol P3 on a third network R3. According to one variant, the intermediate server Sv' also communicates via the network R3.

A network R2 corresponds to a second wide area network R2 on which the communication may be carried out by a second protocol P2. The server Sv is connected to this wide area network, as well as user terminals T, control points or other home automation devices which may be modelled by nodes N belonging to the second network R2 and communicating according to a target second communication protocol P2, in particular according to a protocol using the IP protocol. By node, is meant an equipment present on a network R2 using the second communication protocol P2 and which possesses a unique location identifier on the network R2.

The server or management unit Sv is arranged to present to the nodes N1, Nk of the network R2 communicating according to the network R2 a set of location identifiers P2AD1, P2AD2, P2ADn according to the target second communication protocol P2 for the devices communicating according to the local first communication protocol P1 and may provide an interface for discovering the home automation devices D1, D2, Dn detailing the type, the functions and/or the state variables of the devices, according to the second communication protocol P2.

Configuration Method

First Implementation

Figure 4:
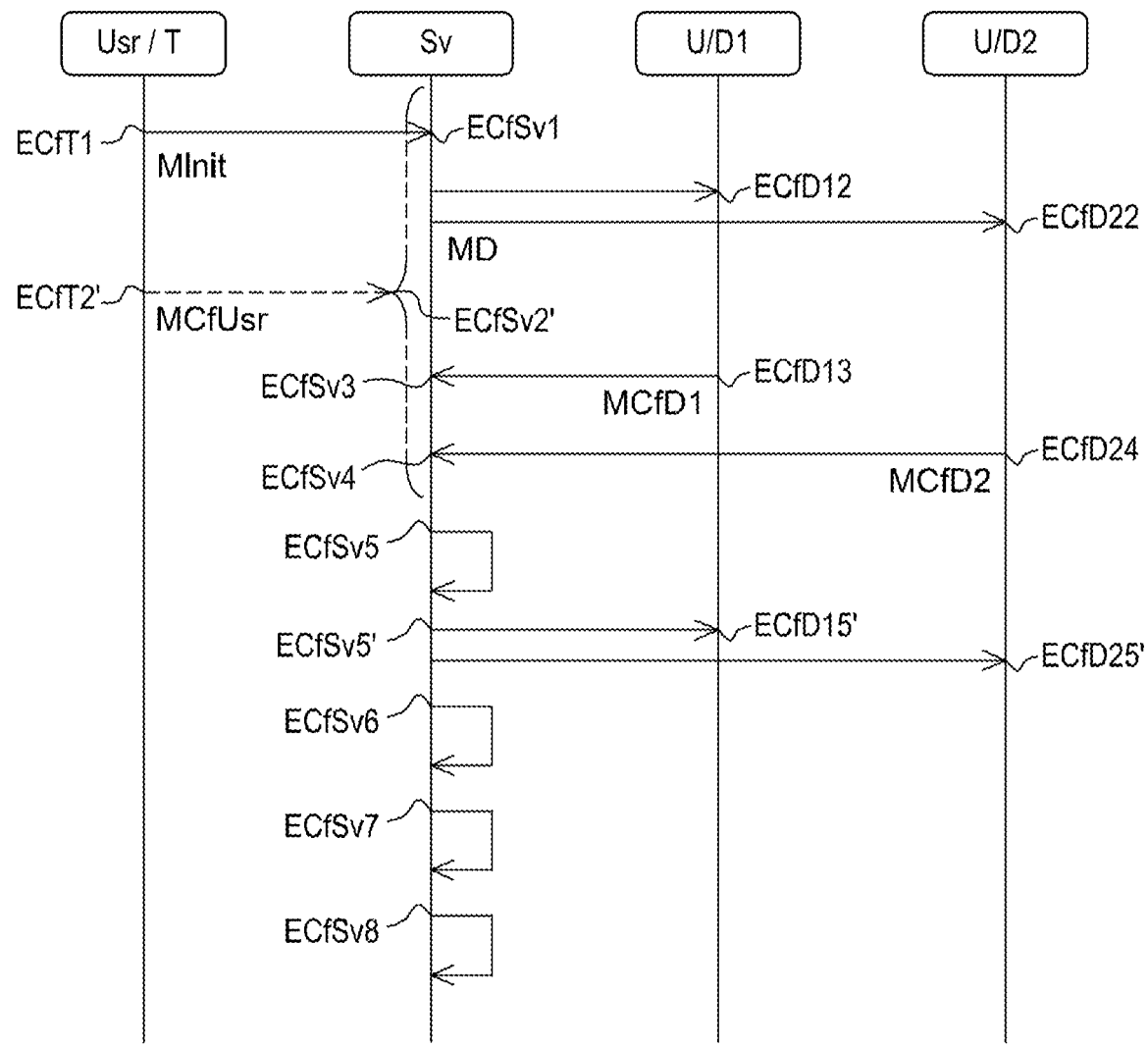
FIG. 4 is a diagram illustrating an implementation of a configuration method of a home automation installation according to the invention.

We will now describe a first embodiment of a configuration method of a home automation installation Su with reference to FIG. 4, so as to obtain the configuration represented in FIG. 3, the method being executed by the management unit or server Sv. Two home automation devices D1, D2 communicating via a central unit to which they are related according to the local first communication protocol P1 are represented in FIG. 4. The devices D1 and D2 may be related to the same central control unit U or to two distinct central control units U. One single home automation device or a number larger than two home automation devices may also be considered.

At a first step EcfSv1, the configuration method may be triggered by the reception of a message MInit received by the management unit Sv originating from a user terminal Usr/T which emits it at a step EcfT1.

At a step EcfSv2, the management unit Sv emits discovery messages MD to the central control unit to which each device D1, D2 is related according to the third communication protocol P3, this message MD being received respectively at steps EcfD12 or ECfD22.

According to one variant, a press on a button of the central control unit U may also enable the triggering of the method. In this case, the configuration message is received by the management unit from the central control unit U. Alternatively or complementarily, an action on a home automation device D, such as a press on a button may be considered as a triggering event. Also in this case, the configuration message is received by the management unit Sv from the central control unit U, the central control unit receiving the message of the home automation device D according to the first communication protocol P1. In this case, it may be considered that the method starts at the step of receiving a configuration message described hereinbelow.

Thus, at steps EcfSv3, EcfSv4, the management unit Sv receives configuration messages MCfD1, MCfD2 originating from the central control unit to which each device D1, D2 is related which emits these messages respectively at steps ECfD12 and ECfD22.

Each of these configuration messages MCfD1, MCfD2 relates to a unique identifier DURL of a home automation device D1, D2 according to the first communication protocol P1 and to:

a type P1TD1, P1TD2 of the at least one home automation device D1, D2; and/or at least one definition of a function P1F1D1, P1F2D1, P1F1D2, P1F2D2 or a group of functions of the at least one home automation device D1, D2 according to said first communication protocol P1 and/or at least one definition of a state variable P1S1D1, P1S2D1, P1S1D2, P1S2D2 or a group of state variables of the at least one home automation device D1, D2 according to said first communication protocol P1.

The unique identifier DURL may be contained in the configuration message or determinable upon reception of this message.

At a step EcfSv5, the management unit Sv obtains a location identifier P2AD1, P2AD2 for each home automation device D1, D2 according to a target second communication protocol P2. The methods for obtaining the location identifier may be multiple and are detailed later on.

At a step EcfSv6, the management unit can proceed with a check-up of the existence of at least one function conversion rule RCFX arranged to convert the definition of the at least one function P1F1D1, P1F2D1, P1F1D2, P1F2D2 according to the first communication protocol P1 into at least one definition of a function P2F1D1, P2F2D1, P2F1D2, P2F2D2 according to the target second communication protocol P2 and/or of a state conversion rule RCSX arranged to convert the definition of the at least one variable state P1S1D1, P1S2D1, P1S1D2, P1S2D2 according to the first communication protocol P1 into at least one definition of a state variable P2S1D1, P2S2D1, P2S1D2, P2S2D2 according to the target second communication protocol P2.

This check-up may be based on the device type P2TD1, P2TD2, or on the definitions of functions, groups of functions and/or on the definitions of state variables or groups of state variables. Indeed, depending on the used protocols, a type may be sufficient to identify the supported functions or state variables, such as for example in the io-Homecontrol protocol, or functions or groups of functions or variables or groups of state variables should be listed, such as for example in the Zwave protocol.

Alternatively, the management unit Sv may identify a correspondence between a type P1TD1, P1TD2 of a home automation device according to the local first communication protocol P1 and a type P2TD1, P2TD2 of a home automation device according to a local second communication protocol P2.

The conversion rules may be stored in one or several correspondence tables, comprised within a knowledge base.

In the case where such a conversion rule is not available, the management unit Sv may proceed with its obtainment, for example by proceeding with a download from the server Sv. Next, the conversion rule(s) may be registered at a step EcfSv6.

The setup of the conversion of a function may also comprise a step of defining an action to carry out at least partially by the management unit Sv or the central control unit U in correspondence with a function according to the second protocol corresponding to a location identifier, or still the restriction of the requested function or the banning of a function to be carried out. Alternatively, the corresponding definitions may be predefined in the correspondence table or knowledge base.

Alternatively, the conversion of the functions or state variables may be implemented in the context of the control and/or supervision method.

Examples of conversion or partial completion by the management unit or the central control unit are given later on in the context of the description of the control or supervision method.

Figures 5, 6, 7:
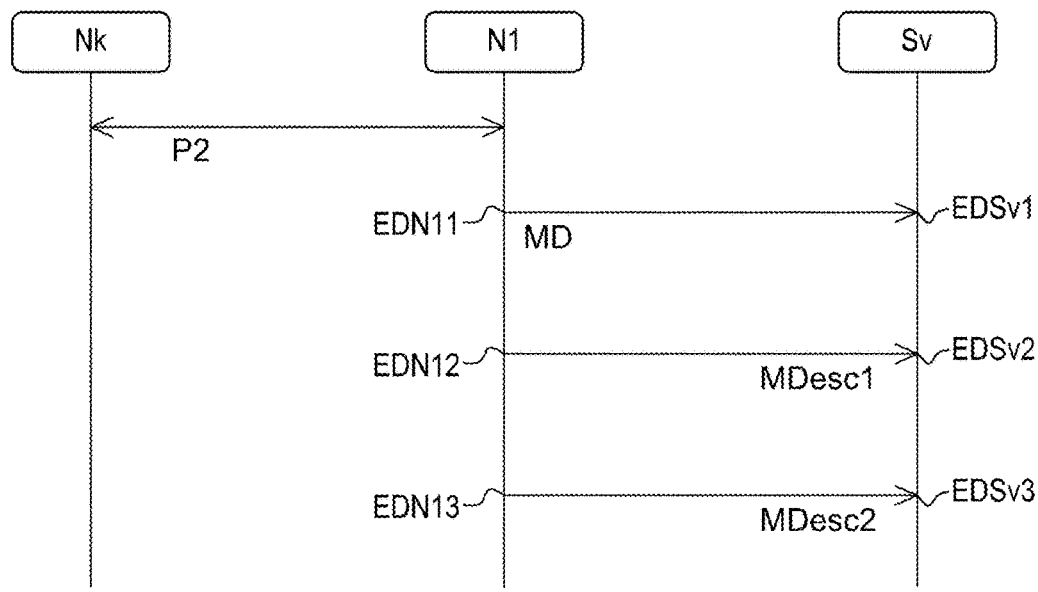
FIG. 5 is a table of correspondence between functions, groups of functions, state variables, groups of state variables or types expressed according to the third communication protocol and functions, groups of functions, state variables, groups of state variables or types expressed according to the target second communication protocol.
FIG. 6 is a table of nodes identifying the relationships between unique identifiers of home automation devices expressed according to the first communication protocol and location identifiers expressed according to the target second communication protocol.
FIG. 7 is a diagram illustrating an implementation of a discovery method of a home automation installation according to the invention.

At a step EcfSv7, the management unit Sv registers the correspondence between the home automation device unique identifier DURL of the at least one home automation device D1, D2 according to the first communication protocol and the location identifier P2AD1, P2AD2 of the at least one home automation device D1, D2 according to the second communication protocol P2 in a nodes table illustrated in FIG. 6.

At a step EcfSv8, the management unit Sv also registers in the nodes table:
- the at least one type P2TD1, P2TD2 of the at least one home automation device D1, D2; and/or
- the at least one definition of a function P1F1D1, P1F2D1, P1F1D2, P1F2D2 or of a group of functions of the at least one home automation device D1, D2 and/or the at least one definition of a state variable P1S1D1, P1S2D1, P1S1D2, P1S2D2 or of a group of state variables of the at least one home automation device D1, D2; and/or
- a function conversion rule RCFX arranged to convert the definition of the at least one function P1F1D1, P1F2D1, P1F1D2, P1F2D2 or group of functions according to the first communication protocol P1 into at least one definition of a function P2F1D1, P2F2D1, P2F1D2, P2F2D2 or of a group of functions according to the target second communication protocol P2; and/or
- a state conversion rule RCSX arranged to convert the definition of the at least one state variable P1S1D1, P1S2D1, P1S1D2, P1S2D2 according to the first communication protocol P1 into at least one definition of a state variable P2S1D1, P2S2D1, P2S1D2, P2S2D2 according to the target second communication protocol P2.

Once the steps of the configuration method are completed, the home automation device D1 is virtualized. The management unit Sv can act on behalf of D1 on the network R2.

Variants

According to one variant, a group of devices may be identified by the same location identifier according to the second protocol. In this case, the correspondence table comprises several location identifiers according to the first communication protocol which correspond to the same location identifier according to the second communication protocol. These arrangements allow considering a configuration of a group of devices controllable as one single device, effectively by one single function call.

According to one variant, the method comprises a plurality of steps of receiving configuration messages corresponding to a plurality of first communication protocols.

According to one variant, the method comprises a plurality of steps of emitting discovery messages according to a plurality of first communication protocols.

According to one variant, the method comprises a plurality of correspondences between a device communicating according to the first communication protocol and location identifiers according to several second control methods.

According to one variant, depending on the considered first communication protocol P1, it may be necessary for the management unit Sv to send a subscription message MI at a step ECfSv5' in order to subscribe to notifications relating to at least one state variable of at least one home automation device D1, D2, the central control unit to which the home automation devices are related receiving this message respectively at steps EcfD15', EcfD25'. Thus, notifications regarding the state variables will be communicated to the management unit in the context of a supervision method.

Obtainment of a Location Identifier According to the Target Second Communication Protocol Obtainment of a location identifier according to the target second communication protocol, that is to say a unique identifier in the considered wide area network, will now be described according to two implementations.

In the case of the first communication protocol, it is particularly possible to use, as a location identifier, an address in a proprietary format corresponding to the used home automation protocol.

In the case of the target second protocol, a location identifier may in particular consist of a network address, such as for example an IPv4 or IPv6 address, or still a composition of a network address and of a resource identifier indicated by an access path, for example in the form of the following URL:

<protocol>://<host address>[:<port>]/<resource path>

We describe hereinbelow two implementations in which the location identifier corresponds respectively to a network address or to a combination of a network address and of a resource.

According to a first implementation, the target second communication protocol involves the use of distinct network addresses for the home automation devices. In this case, the location identifier corresponds to a network address.

According to a first possibility, the network address is selected in a block of free addresses assigned to the Server Sv. For example, in the case of the IPv6 protocol, a prefix is associated to the communication interface of the Server Sv on the network R2, the remainder of the address (suffix) being left at the discretion of the Server Sv. In the case of a wide area network such as the Internet, this prefix may define a unicast block of global address and should be obtained beforehand before an accredited provider.

According to a second possibility, the network address is equal to, or contains the physical address of the device, such as for example in the case of an IPv6 protocol used in the Link-local mode. In this case, at a first step, the management unit Sv determines a unique physical address for the device D1 to emulate.

According to a first example, in the case of a protocol based on the IP protocol, the management unit Sv may choose a MAC address within a range acquired beforehand with the IEEE registration organism, the address corresponding to a composition:

Company_id+free suffix

Wherein:

company_id corresponds to a manufacturer identifier for example over 3 bytes;

free suffix, corresponds to a unique identifier of the device D1 on the network R2, for example over 3 bytes. For a management unit Sv that can emulate up to 255 home automation devices, all it needs in this case is to vary the last byte in order to identify the home automation devices D.

At a second step, the management unit Sv determines a unique network address from the physical address.

According to some target second protocols P2, the network address is obtained by applying an injective transformation from the physical address, such as for example in the case of the IPv6 Link-local protocol, in which the network address is constructed from the MAC address.

According to a third possibility, the network address is obtained from a network controller on presentation of a physical address. As example, this may be the case in a protocol on top of IP.

In this third possibility, at a first step, the management unit determines a unique physical address for the device D1 to emulate, in the same manner as with the aforementioned first possibility. At a second step, the management unit Sv obtains a unique network address on the network R2 with a network controller from the physical address. As example, the network controller may be a DHCP Server for IPv4 or IPv6.

According to a second implementation, the network address may be shared for several home automation devices D1, D2. In this case, the location identifier corresponds to a composition of a network address and of a resource identifier indicated by an access path. In this case, it may be sufficient to obtain a network address for the management unit Sv.

The different home automation devices are then associated to different resources corresponding to distinct access paths. As example, considering an OIC/Iotivity type protocol, by obtaining for the management unit Sv an address 192.168.0.2, it is possible to assign the identifiers of two lighting-type devices as follows:

oc://192.168.0.2:1234/light/1
oc://192.168.0.2:1234/light/2

The resource /light/1 is assigned to the first lighting-type device. The resource /light/2 is assigned to the second lighting-type device.

Unique Identifier of a Home Automation Device

The management unit Sv and the central control units U may use a unique identifier DURL to identify the home automation devices. The structure of a unique identifier of a home automation device DURL will now be described in connection with a particular embodiment.

According to this embodiment, the unique identifier of a home automation device comprises information on:

The local native protocol of the home automation device ID,

The communication path to the device D, including the intermediate central control units U and the termination addresses to cross, whether organized or not in a hierarchical topology;

A subsystem identifier subsystemId if the device belongs to a group of devices D associated to the same address. The devices that are a unique expression of an address have no extension for identifying a subsystem.

Thus, the form of the unique identifier of a device DURL may be as follows:

<protocol>://<gatewayId>/<rawDeviceAddress>(#<subsystemId>)

Wherein the following fields are present:

protocol: identifier of the native device local protocol.

gatewayId: identifier of the first central control unit U, for example a serial number or a unique identifier.

rawDeviceAddress: a simple or multi-level path. Its meaning and its format depend on the addressing scheme of the local communication protocol of the device D.

subsystemId: this optional field indicates an identification, for example a rank of the subsystem (starting for example at 1), if such a subsystem is present.

EXAMPLES 1) knx://0201-0001-1234/1.1.3

This unique identifier DURL corresponds to a device D communicating by the KNX procotol with an individual address 1.1.3 accessible to the central control unit U carrying the identifier #0201-0001-1234.

2) io://0201-0001-1234/145036#2

This unique identifier DURL corresponds to a subsystem carrying the number 2 associated to a device D communicating by the io-Homecontrol protocol with a radio address 145036 accessible to the central control unit U carrying the identifier #0201-0001-1234.

Variant

According to one variant, the step of obtaining the location identifier may correspond to a reception of an input by the user of a location identifier according to the second communication protocol as represented in FIG. 4 by step ECfSv2'.

According to one variant, the step of receiving a configuration message comprises a declaration by the user of the location identifier according to the first communication protocol and/or a declaration by the user of at least one function or of a device type according to the first communication protocol as represented in FIG. 4 by step ECfSv2'.

Discovery Method

We will now describe an embodiment of a discovery method of a home automation installation Su with reference to FIG. 7. We will assume herein that the configuration method as described in FIG. 4 has been executed beforehand, so as to obtain the configuration represented in FIG. 3.

The method is executed by the management unit Sv. Only two nodes N1, Nk communicating according to the target second communication protocol P2 on the network R2 are represented in FIG. 7. Nonetheless, one single node or more than two nodes may also be considered.

At a step EDSv1, the management unit Sv receives a discovery message MD emitted by a node N1 according to the second communication protocol P2 at a step EDN11.

The discovery message EDN11 may comprise a filter criterion for example on the basis of a location identifier or a group of location identifiers or else on the basis of information relating to an installation Su and/or to an account of a user Usr and/or to a type of products.

The discovery message EDN11 may be addressed to a location identifier or specific address on the management unit Sv corresponding to a location identifier of a register.

At a step EDSv2, the management unit Sv sends a first compliance announcement and description message MDesc1 according to a target second communication protocol P2 in connection with the location identifier P2AD1 of the first home automation device D1 and comprising:

a type P2TD1 of the home automation device D1, or at least one description of a function P2F1D1, P2F2D1 according to the second communication protocol P2, and/or at least one description of a state variable P2S1D1, P2S2D1 of the home automation device D1 according to the second communication protocol P2.

In the same manner, the management unit sends at a step EDSv3 a second compliance announcement and description message MDesc2 according to the target second communication protocol P2 in connection with the location identifier P2AD2 of the second home automation device D2 and comprising:

a type P2TD2 of the home automation device D2, or at least one description of a function P2F1D2, P2F2D2 according to the second communication protocol P2, and/or at least one state variable P2S1D1, P2S2D1 of the home automation device D1 according to the second communication protocol P2.

Thus, a publication of a location identifier according to the target second communication protocol is carried out for home automation devices D1, D2 that can communicate only according to a local or proprietary protocol.

In this implementation, the compliance announcement and description messages are combined.

They may also be distinct. Thus, the management unit may send:

firstly, a compliance announcement or existence declaration message in connection with a location identifier P2AD1, of a first home automation device D1 to at least one node N1 communicating according to the target communication protocol P2, then a description message according to the target second communication protocol P2 in connection with a type P2TD1 of the home automation device D1 or at least one description of a function P2F1D1, P2F2D1 or of a group of functions according to the second communication protocol P2 and/or of at least one state variable P2S1D1, P2S2D1 or of a group of state variables of the home automation device D1 according to the second communication protocol P2.

Variant

According to one variant, the management unit Sv may periodically check-up the availability of the home automation devices and send description and/or existence declaration messages only in case of availability of the concerned home automation device.

Control Method

First Implementation

Figure 8:
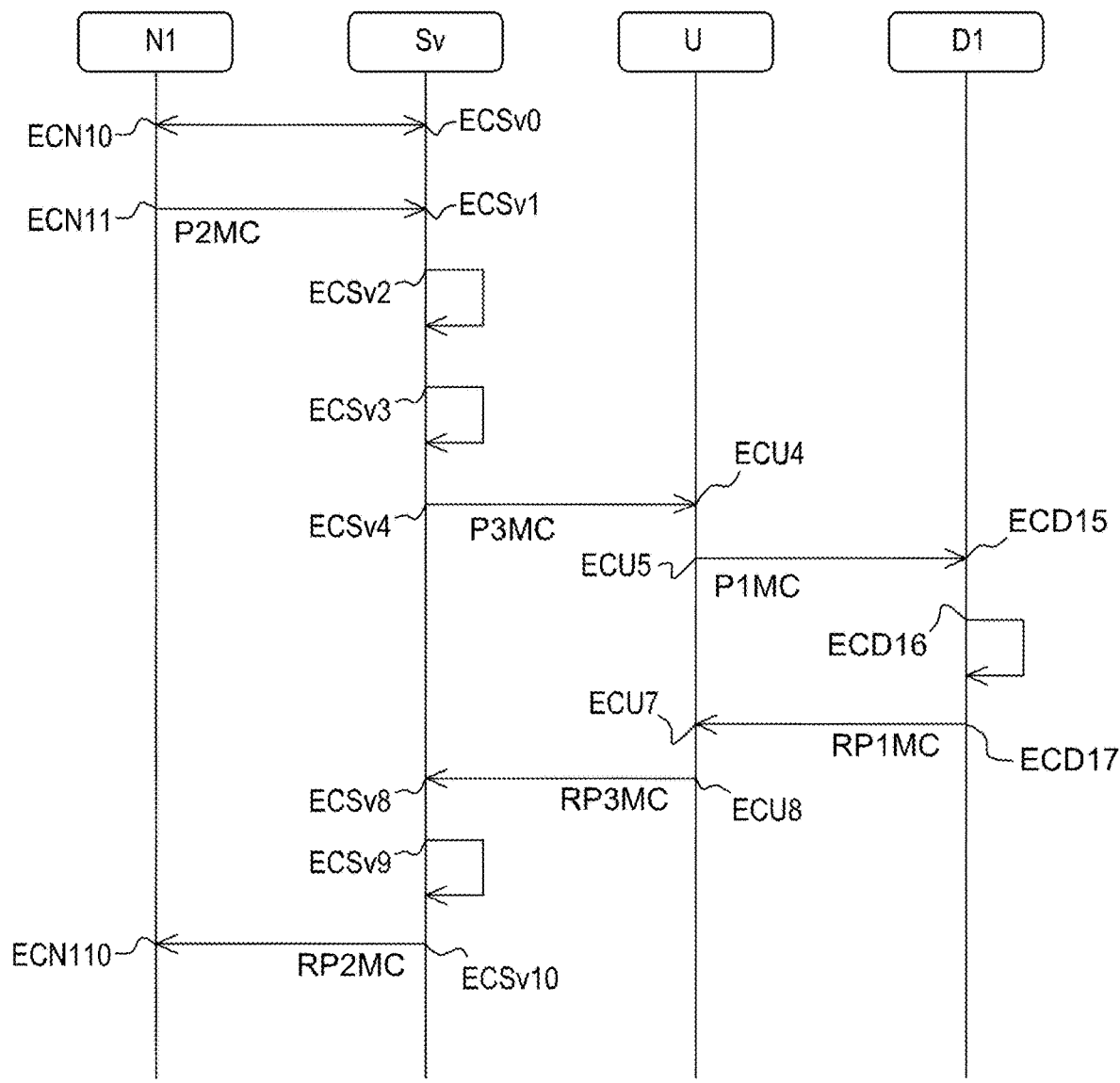
FIG. 8 is a diagram illustrating an implementation of a control method of a home automation installation according to the invention.

We will now describe a first embodiment of a control method of a home automation installation Su with reference to FIG. 8. We will assume herein that the configuration method as described in FIG. 4 has been executed beforehand, so as to obtain the configuration represented in FIG. 3. We will assume that a discovery method as described in FIG. 7 has also been executed.

The control method is executed by the management unit Sv. Only one node N1 communicating according to the target second communication protocol P2 on the network R2 is represented in FIG. 8. Nonetheless, one single node or more than two nodes may also be considered. In the same manner, only one home automation device D1 communicating, via a central control unit U, according to the local first protocol P1 is represented but other devices may be present.

At an optional prior step ECSv0, a connection may be established between the node between a node N1 communicating according to the second communication protocol P2 and the management unit Sv, the management unit Sv acting on the network R2 as a virtual representative of the home automation devices of the network R1 communicating, via a central control unit U, according to the local first communication protocol P1.

At a first step ECSv1, the management unit Sv receives at least one control message P2MC originating from a node N1 communicating according to the second communication protocol P2. The control message P2MC which is emitted by the node N1 at a step ECN11 comprises at least one location identifier P2AD1 of a home automation device D1 according to the target second communication protocol P2 and at least one definition of a function P2F1D1 of the home automation device D1 according to the second communication protocol P2. In this instance, we will assume that the device concerned by the command is the device D1 identified by the location identifier P2AD1, and that the concerned function is a function P2F1D1 intended to this single home automation device.

At a step ECSv2, the management unit Sv determines a home automation device unique identifier DURL corresponding to the location identifier P2AD1 of the at least one home automation device D1 according to the second communication protocol P2 received in the control message P2MC.

At a step ECSv3, the management unit Sv applies a function conversion rule RCFX arranged to convert the definition of the function P2F1D1 according to the target second communication protocol P2 into at least one definition of a function P1F1D1 according to the local first communication protocol P1. For this purpose, the management unit Sv may use the correspondence table inputted during the configuration method.

The step of applying a conversion rule may comprise the completion of processing steps complementary to the command call, in particular if a portion of the function cannot be carried out on the home automation device, and in particular a partial enrichment of the function, or still the restriction of the requested function or the banning of a function to be carried out.

As example, a planning of a command may be provided if the device itself does not enable such a planning. Thus, it is possible to implement on the management unit or on the central control unit a «Calendar Weave» type function in order to trigger an opening command on Monday at 8.00 AM for an awning-type home automation device. Also as example, a parameter conversion may be carried out by the central control unit.

At a step ECSv4, the management unit Sv sends at least one control message P3MC according to the third communication protocol P3 to the central control unit U to which the at least one home automation device D1 corresponding to the home automation device unique identifier DURL is related and to the function P1F1D1 according to the local first communication protocol P1 which receives it at a step ECU4.

At a step ECUS, the central control unit formats and sends a message P1MC including the elements contained in the message P3MC to the home automation device D1 according to the first control protocol P1. The message P1MC is received at a step ECD15.

At a step ECD16, the home automation device D1 executes the function P1F1D1.

At a step ECD17, the home automation device D1 sends a control feedback message RP1MC according to the first communication protocol P1 to the central control unit U which receives it at a step ECU7. The message contains a control feedback information P1RC expressed according to the local first communication protocol P1.

At a step ECUS, the central control unit U sends a control feedback message RP3MC according to the third communication protocol P3 to the management unit Sv which receives it at a step ECSv8. This message contains the control feedback information P1RC expressed according to the local first communication protocol P1.

At a step ECSv9, the management unit applies, where necessary, a function conversion rule RCFX in order to convert a control feedback information P1RC expressed according to the local first communication protocol P1 into a control feedback information P2RC expressed according to the target second communication protocol P2.

At a step ECSv10, the management unit Sv emits at least one control feedback message RP2MC to the node N1 comprising a control feedback information P2RC according to the target second communication protocol P2.

Variants

According to one variant, the management unit Sv may receive a control message P2MC corresponding to a grouped command intended to a set of home automation devices identified by a set of location identifiers. In this case, a plurality of control messages P1MC are sent to the concerned control devices, after conversion of the concerned function and the location identification for each device. Next, the management unit may optionally aggregate the results or feedback communicated by the home automation devices D so as to return a unique control feedback message P2RC. As example, it may be agreed that the command is considered to be successfully completed if all completions of individual functions have a positive feedback, or to have failed if one of the functions for a home automation device returns a failure value.

According to another variant already mentioned in the context of the configuration method, a group of devices may be identified by the same location identifier according to the second protocol. In this case, the correspondence table comprises several home automation device unique identifiers according to the first communication protocol which correspond to the same location identifier according to the second communication protocol. In this case, it is possible to proceed as previously mentioned for the grouped command. A plurality of functions according to the first communication protocol is sent to the concerned devices corresponding to the plurality of location identifiers according to the first communication protocol, and then the feedbacks are stored and then aggregated so as to return one single result for the considered control message.

Supervision Method

Figure 9:
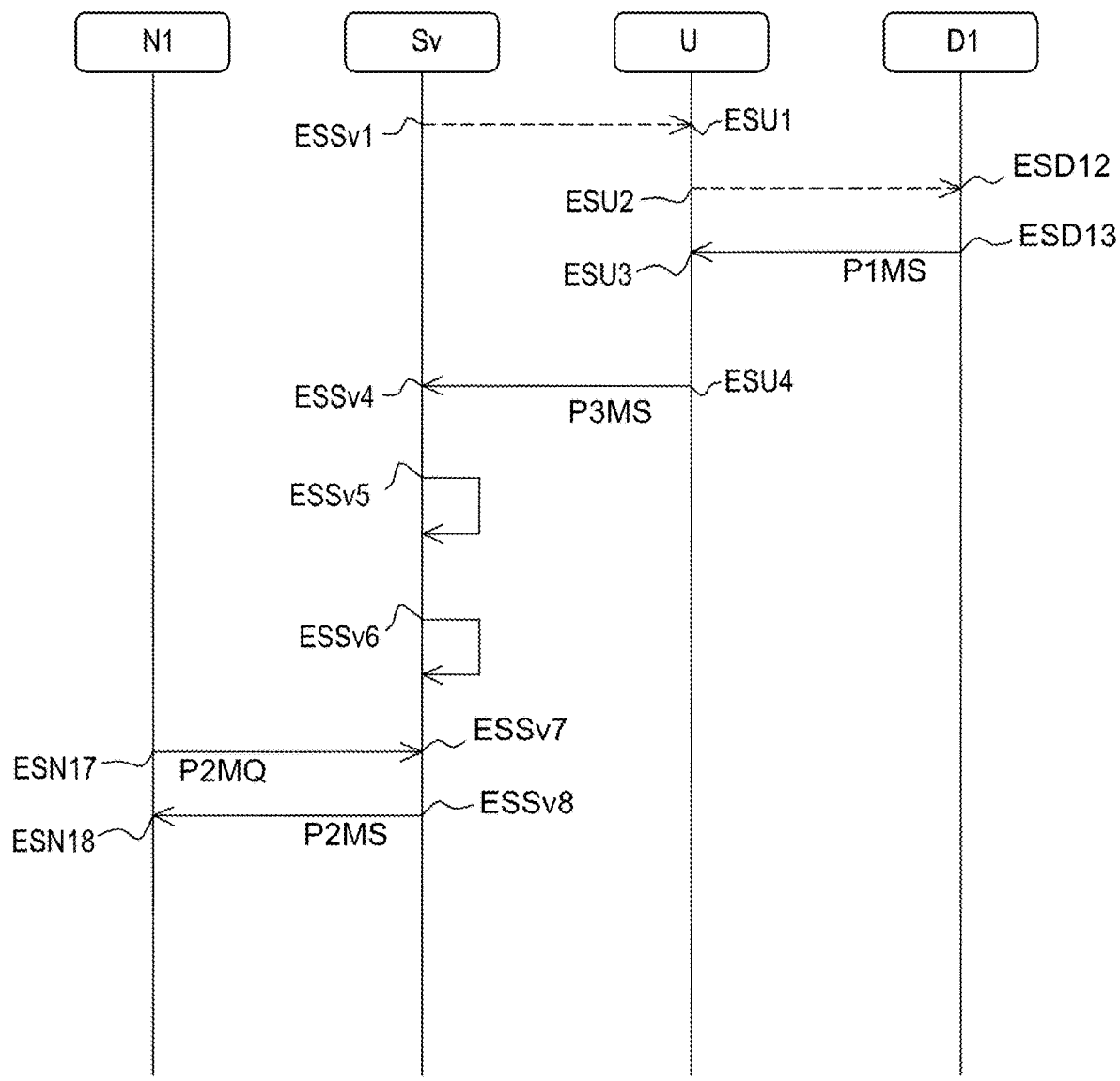
FIG. 9 is a diagram illustrating an implementation of a supervision method of a home automation installation according to the invention.

We will now describe a first embodiment of a supervision method of a home automation installation Su with reference to FIG. 9. We will assume herein that the configuration method as described in FIG. 4 has been executed beforehand, so as to obtain the configuration represented in FIG. 3. We will assume that a discovery method as described in FIG. 7 has also been executed.

The supervision method is executed by the management unit Sv. Only one node N1 communicating according to the target second communication protocol P2 on the network R2 is represented in FIG. 9. Nonetheless, one single node or more than two nodes may also be considered. In the same manner, only one home automation device D1 communicating, via a central control unit U, according to the local first protocol P1 is represented but other devices may be present.

At a step ESSv4, the management unit Sv receives a supervision message P3MS according to the third communication protocol P3 emitted by a central control unit U to which a home automation device D1 is related at a step ESU4. The supervision message P3MS comprising an information relating to a value of at least one state variable P1S1D1 of the at least one home automation device D1 according to the first communication protocol P1. The step ESSv2 may be subsequent to a first step ESSv1 of sending an interrogation or polling message, received by the central control unit U to which the home automation device D1 is related at a step ESU1. Alternatively, sending of a message P1MS may be autonomously initiated by the home automation device D1 at a step ESD13 or the central control unit U, for example by detecting an event modifying the value of a state variable P1S1D1. A step ESU2 of sending an interrogation or polling message may also be implemented by the central control unit U to the home automation device D, for example, in order to detect a change in the value of a state variable P1S1D1.

Sending of the message P1MS may be indifferently carried out to a set of nodes present on the network communicating according to the first communication protocol. This arrangement corresponds to a mode called «Broadcast» mode. According to an alternative implementation, the home automation device may send the supervision message only to the nodes subscribed on the network established according to the first communication protocol, and in particular to the central control unit U if the latter is subscribed. In this case, the central control unit U carries out a prior step of sending to the home automation device D1 a request for registration in a subscription list to an event relating to the at least one state variable P1S1D1 of the home automation device D1.

At a step ESSv5, the management unit Sv applies a state conversion rule RCSX in order to convert the at least one information relating to a value of at least one state variable P1S1D1 of the at least one home automation device D1 expressed according to the local first communication protocol P1 into a value of at least one state variable P2S1D1 of the home automation device D1 expressed according to the target second communication protocol P2.

At a step ESSv6, the management unit Sv determines a location identifier P2AD1 of the home automation device P2AD1 according to the second communication protocol P2 based on the home automation device D1 unique identifier DURL contained in the message P3MS or determinable based on identification elements contained in this message. The steps ESSv5 and ESSv6 of applying a conversion rule and of address or identifier determination may be carried out sequentially in any order or simultaneously.

At a step ESSv7, the management unit Sv sends a supervision message P2MS to the node N1 communicating according to a second communication protocol P2, the supervision message P2MS comprising an information relating to a value of at least one state variable P2S1D1 of the home automation device D1 according to the target second communication protocol P2 and in connection with the location identifier P2AD1 of the home automation device D1 according to the second communication protocol P2.

According to one possibility, sending of the supervision message P2MS may be carried out on the initiative of the management unit Sv spontaneously or upon reception of a supervision message P3MS originating from a central control unit U to which a home automation device D1 is related. According to another possibility, the supervision message P2MS may be sent upon reception by the management unit Sv at a step ESSv5 of a request message MQ emitted at a step ESN15 originating from a node N1 of the wide area network R2. According to this second possibility, the management unit Sv comprises a space or base for storing the values of state variables for the home automation devices related thereto.

In the context of a direct sending on the initiative of the management unit Sv, sending of the supervision message P2MS may be indifferently carried out to a set of nodes present on the network communicating according to the second communication protocol P2. This arrangement corresponds to a mode called «Broadcast» mode. According to an alternative implementation, the central control unit may send the supervision message only to the nodes of the network R2 registered in a subscription list, and in particular to the node N1. In this case, the node N1 carries out a prior step of sending to the management unit Sv a request for registration in a subscription list to an event relating to the at least one state variable P2S1D1 of the home automation device D1.

Variant

According to one variant, the supervision method may be adapted to a control point. In this case, the command is identified and is notified to the management unit as a modification of a state variable.

According to one variant, the aforementioned polling step ESSv1 allows implementing an event-based emulation for a device or a central control unit U that does not offer such a feature, in which the management unit Sv may periodically consult the values of state variables of the devices via a central control unit U, detect the modifications on the values of state variables by comparing the last obtained value and the datum (data) that it has stored before and send, in case of modification, a supervision message P2MS relating to the modified state variable to a node N1 subscribed to the modifications of this state variable.

EXAMPLES

Example 1

In this example, a temperature sensor type home automation device D1 is considered. This sensor communicates according to an io-Homecontrol type local first protocol P1 and is intended to be made accessible as a sensor according to the second communication protocol P2 using an OIC/lotivity type application layer and a CoAP on IPv6 type transport layer by the management unit Sv.

The configuration method may be implemented as follows.

During the process of pairing the io-Homecontrol sensor to the central control unit U, the home automation device D is described as a 0x03 (outside temperature sensor, unit: ° K) type system IO sensor with a location identifier according to the first protocol P1 in the form of a network address IO 0x485670.

The central control unit U is subscribed with the home automation device D (IO sensor) so as to receive events relating to the variation of the measured temperature, which corresponds to a state variable P1S1 of the device.

Afterwards, the central control unit U proceeds with the transmission according to the third communication protocol P3 of this information to the management unit Sv, which corresponds to a step ECfD13, in particular the location identifier P1AD1 of this device according to the protocol P1 and the type of the device D1.

The management unit Sv then proceeds with the automatic determination of a lotivity standard type or profile to be used in order to publish this device by using a correspondence table according to the protocol P1 and the product type in order to determine a conversion rule at a step ECfv6.

Afterwards, the management unit Sv proceeds with the determination of a location identifier P2AD1 according to the protocol P2, in this instance a free IPv6 address for the device, corresponding to step ECfsv5. In particular, this network address may be arbitrarily selected in an IPv6 prefix assigned beforehand to the management unit. For example, the management unit Sv chooses to assign the IPv6 address 2001:0db8:3c4d:0015:0000:0000:abcd:ef13 to represent the home automation device D1 in the form of an «avatar» on the network R2.

At a step ECfsv7, the management unit Sv proceeds with the registration of the correspondence of the device type according to the first and second protocol P2 and of a device unique identifier DURL in the nodes table.

A discovery method may then be implemented if the second protocol P2 allows so. On the contrary (for example in the case of an IPv6 address published on the Internet), the address P2AD1 selected for the avatar of the device D1 may be published in a names register or through a search API which will enable the user to determine this address.

Afterwards, the supervision or control method may be implemented.

Thus, a radio IO event emitted by the sensor associated to a location identifier according to the first communication protocol P1—herein an address IO 0x485670—in the form of a message P1MS at a step ESD13 is received at a step ESU3 by the central control unit U.

The central control unit U transmits the information by sending a message P3MS according to the third communication protocol P3 at a step ESU4 to the management unit Sv which receives it at a step ESSv4 and will determine the corresponding location identifier according to the second communication protocol P2 by using the nodes table at a step ESSv6.

At a step ESSv5, the management unit Sv determines whether the temperature state variable P1S1D1 possesses a correspondence in the lotivity profile associated to the virtual device and the possible conversion function. In the considered example, the temperature state variable in Kelvin degrees of the home automation device D1 may be adapted on a notification related to the state variable P2S1D1 representing the temperature in Celsius degrees.

The management unit Sv applies the following conversion function which corresponds to a conversion into Celsius degrees and into an integer value with a 0.01 accuracy:

$$T \to \text{floor}((T-273.15)*100).$$

The management unit Sv may then keep this value in order to be able to respond to a subsequent request on the second protocol P2, for example a «GET» type CoAP query or send a supervision message P2MS to possible clients having subscribed beforehand to the events of the device D1 by an «OBSERVE» type CoAP query, in the form of a CoAP notification message to the connected node N1 containing the new temperature value P2S1D1 at a step ESSv7.

According to a variant using the control method, an active reading of the temperature may be carried out.

In this case, the node N1 which is a lotivity client sends a read request to the management unit Sv regarding the state variable or characteristic «Temperature» of the virtual device, at a step ESN11. The control message P2MC emitted by the node N1 comprises a location identifier P2AD1 of a home automation device D1 according to the target second communication protocol P2 and a definition of a function P2F1D1 of the home automation device D1 corresponding to an interrogation of the temperature variable according to the second communication protocol P2.

At a step ECSv2, the management unit Sv determines a unique identifier DURL of the home automation device D1 corresponding to the location identifier P2AD1 of the at least one home automation device D1 according to the second communication protocol P2 received in the control message P2MC.

At a step ECSv3, the management unit Sv applies a function conversion rule RCFX arranged to convert the definition of the function P2F1D1 according to the target second communication protocol P2 into at least one definition of a function P1F1D1 according to the local first communication protocol P1. The management unit Sv may respond by using the last value received from the IO sensor or send a command to the device through the central control unit U in order to obtain this value. Thus, at a step ECSv4, the management unit Sv sends a control message P3MC according to the third communication protocol P3 to the central control unit U to which the at least one home automation device D1 corresponding to the device unique identifier DURL is related and to the function P1F1D1 according to the local first communication protocol P1 which receives it at a step ECU4.

At a step ECUS, the central control unit formats and sends a message P1MC including the elements contained in the message P3MC to the home automation device D1 according to the first control protocol P1. The message P1MC is received at a step ECD15.

At a step ECD16, the home automation device D1 executes the function P1F1D1 and sends back in this case a temperature value.

At a step ECD17, the home automation device D1 sends a control feedback message RP1MC according to the first communication protocol P1 to the central control unit U which receives it at a step ECU7. The message contains a control feedback information P1RC corresponding to the temperature.

At a step ECUS, the central control unit U sends a control feedback message RP3MC according to the third communication protocol P3 to the management unit Sv which receives it at a step ECSv8. This message contains the control feedback information P1RC expressed according to the local first communication protocol P1.

At a step ECSv9, the management unit Sv applies a function conversion rule RCFX in order to convert a control feedback information P1RC expressed according to the local first communication protocol P1 into a control feedback information P2RC expressed according to the target second communication protocol P2.

At a step ECSv10, the management unit Sv emits at least one control feedback message RP2MC to the node N1 comprising a control feedback information P2RC according to the target second communication protocol P2 which corresponds to the temperature.

Example 2

According to a second example, a micro-module type home automation device D1 for a Yokis rolling shutter is considered. This home automation device D1 communicates according to a proprietary radio communication protocol P1 of the manufacturer. This home automation device can communicate with a central control unit U having an adequate emitter/receiver. It is desired to publish an avatar of this device on a wide area network such as the Internet using the management unit Sv, by using a second communication protocol P2 based on messages in the JSON format in a MQTT encapsulation and a TCP on IPv6 transport.

In the context of this example, the management unit Sv may be a server accessible on the Internet and the central control unit U may be a home automation box connected to the management unit via a TCP connection permanently established through the local area network of the user and its Internet gateway, for example an ADSL modem.

The following configuration method may be implemented.

At a first step of pairing the micro-module to the central control unit, the central control unit U obtains the unique address of the module according to the protocol P1, for example 0x2A370.

At a step ECfD13, this address and the type of the discovered device are transmitted by the central control unit U in the form of a message JSON which serves as the third protocol P3 to the management unit Sv which receives this message at a step ECfSv3.

At a step ECfv5, the management unit Sv determines an available IPv6 address in a block of addresses obtained beforehand, for example the IPv6 address 2001:0db8:3c4d:0015:0000:0000:abcd:0644.

At a step ECfv7, the management unit registers the correspondence between the identifier of the device DURL—constituted by the identifier of the central control unit U, the address of D1 according to the protocol P1—and the selected IPv6 address in a correspondence table. The management unit also listens out on this network address, where necessary, in order to be able to receive messages to the avatar of the device.

At a step ECfv8, the management unit also registers a type of the home automation device.

| Example of a correspondence table | | |
|---|---|---|
| Device type | DURL | P2AD1 |
| MVR500ERP | yokis://0201-0001-1234/2A370 | 2001:0db8:3c4d:0015:0000:0000:abcd:0644 |

The following control method may then be implemented.

At a step ECN11, a driver application executed on a node N1, for example by another home automation device connected to the Internet, by a device or a control server, sends a control message P2MC to the IPv6 address of the avatar of the device D1 according to the protocol P2 which receives it at a step ECSv1. For example, the control message may correspond to a request for opening the rolling shutter.

At a step ECSv2, the management unit Sv determines from the correspondence table established during the configuration phase an identification of the home automation device concerned by the home automation device unique identifier DURL.

This identifier contains the identifier of the central control unit U that can monitor the device as well as the protocol P1, the type and the address of the device D1 according to this protocol.

At a step ECSv3, the management unit Sv converts the command into the format expected by the device D1 according to the first communication protocol P1, namely an UP command, then at a step ECSv4, transmits this information in the form of a control message P3MC to the associated central control unit U according to the third communication protocol P3, the central control unit receiving this message at a step ECU4.

At a step ECU5, the central control unit U retransmits the order towards the micro-module in the form of a control message P1MC by using the first communication protocol P1, herein the Yokis radio protocol, which receives this message at a step ECD15.

At a step ECD16, the micro-module executes the command and moves the rolling shutter upwards.

At a step ECD17, the micro-module sends back a confirmation message RP1MC indicating that it has well taken into account the command to the central control unit U, which receives it at a step ECU7.

At a step ECU8, the central control unit U sends back this information with the identifier of the device D1 to the management unit Sv in a message RP3MC according to the third protocol to the management unit Sv which receives it at a step ECSv8.

At a step ECSv9, using the correspondence table established during the configuration phase, the management unit Sv converts the control feedback code, and then sends back, at a step ECSv10, a message RP2MC on the network R2 by using the source address P2AD1 and to the node N1 indicating the proper consideration of the command initiated by the node N1.

The invention claimed is:

1. A configuration method of a home automation installation comprising at least one home automation device and at least one central control unit, the method comprising the following steps:
   reception, by a management unit remotely connected to the home automation installation via a wide area network, of at least one configuration message from the at least one central control unit, the at least one configuration message relating to the at least one home automation device and relating to at least one of: a type of the at least one home automation device; at least one definition of a function or of a group of functions of the at least one home automation device according to at least one first communication protocol; at least one definition of a state variable or of a group of state variables of the at least one home automation device according to at least one first communication protocol;
   obtainment, by the management unit, of a location identifier of the at least one home automation device according to a target second communication protocol;
   registration, by the management unit, of correspondence between the location identifier of the at least one home automation device according to the target second communication protocol and of at least one identification element contained in the at least one configuration message or determinable upon reception of the at least one configuration message whose content or combination enables a unique identification of the at least one home automation device;
   registration, by the management unit, of at least one of:
   the type of the at least one home automation device;
   the at least one definition of a function or of a group of functions of the at least one home automation device;
   the at least one definition of a state variable or of the group of state variables of the at least one home automation device;
   a function conversion rule arranged to convert the at least one definition of a function or group of functions according to the at least one first communication protocol into at least one definition of a function or of a group of functions according to the target second communication protocol; and
   a state conversion rule arranged to convert the at least one definition of the state variable according to the at least one first communication protocol into definition of a state variable according to the target second communication protocol.

2. The configuration method according to claim 1, further comprising the following step:
   obtainment of at least one function conversion rule arranged to convert the at least one definition of the function according to the at least one first communication protocol into at least one definition of a function according to the target second communication protocol and/or of a state conversion rule arranged to convert the at least one definition of the state variable according to the at least one first communication protocol into at least one definition of a state variable according to the target second communication protocol;
   registration of the at least one function conversion rule and/or of the state conversion rule.

3. The configuration method according to claim 2, further comprising the following step:
   definition, by the management unit, of an action to carry out at least partially by the at least one central control unit or the management unit in correspondence with a function according to the target second protocol corresponding to a location identifier.

4. The configuration method according to claim 3, further comprises a conversion step that comprises restriction of a requested function or banning of a command/function to be carried out.

5. The configuration method according to claim 2, further comprising a conversion step that comprises restriction of a requested function or banning of a command/function to be carried out.

6. The configuration method according to claim 1, further comprising the following step:
   definition of an action to carry out at least partially by the at least one central control unit or the management unit in correspondence with a function according to the target second protocol corresponding to a location identifier.

7. The configuration method according to claim 6, further comprising a conversion step that comprises restriction of a requested function or banning of a command/function to be carried out.

8. The configuration method according to claim 1, further comprising a conversion step that comprises restriction of a requested function or banning of a command/function to be carried out.

9. A discovery method of a home automation installation comprising at least one home automation device and at least one central control unit, the method comprising the following steps:
- sending, by a management unit remotely connected to the home automation installation via a wide area network, of at least one compliance announcement or description message according to a target second communication protocol in connection with:
- at least one location identifier of the at least one home automation device according to the target second communication protocol which corresponds to a location identifier of the at least one home automation device according to the at least one first communication protocol; and at least one of:
- a type of the at least one home automation device;
- at least one description of a function or of a group of functions according to the target second communication protocol; and
- at least one description of a state variable or of a group of state variables of the at least one home automation device according to the target second communication protocol.

10. A control method of a home automation installation comprising at least one home automation device and at least one central control unit, the control method comprising the following steps:
- reception, by a management unit remotely connected to the home automation installation via a wide area network, of at least one first control message originating from at least one node communicating according to a target second communication protocol comprising at least one location identifier of the at least one home automation device according to the target second communication protocol and at least one definition of a function of the at least one home automation device according to the target second communication protocol;
- determination, by the management unit, of at least one identification element of the at least one home automation device whose content or combination enables a unique identification of the at least one home automation device based on the at least one location identifier of the at least one home automation device according to the target second communication protocol;
- application, by the management unit, of a function conversion rule arranged to convert the at least one definition of the function according to the target second communication protocol into at least one definition of a function according to the at least one first communication protocol;
- sending, by the management unit, at least one second control message to the at least one central control unit to which the at least one home automation device corresponding to the at least one identification element is related, the at least one second control message relating to the function according to the at least one first communication protocol.

11. The control method according to claim 10, further comprising the following steps:
- reception, by the management unit, of at least one control feedback message originating from the at least one central control unit to which the at least one home automation device is related according to the at least one first communication protocol;
- application, by the management unit, of a function conversion rule in order to convert a control feedback information expressed according to the at least one first communication protocol into a control feedback information expressed according to the target second communication protocol;
- sending, by the management unit, the at least one control feedback message to the at least one node communicating according to the target second communication protocol, the at least one control feedback message comprising a control feedback information according to the target second communication protocol.

* * * * *